(12) United States Patent
Wang (10) Patent No.: US 7,688,577 B2
(45) Date of Patent: Mar. 30, 2010

(54) EXTERNAL BOX WITH SHOCKPROOFING MECHANISM

(75) Inventor: Jen-Hung Wang, Taipei Hsien (TW)

(73) Assignee: Cooler Master Co., Ltd., Taipei Hsien (TW)

( * ) Notice: Subject to any disclaimer, the term of this patent is extended or adjusted under 35 U.S.C. 154(b) by 195 days.

(21) Appl. No.: 11/775,446

(22) Filed: Jul. 10, 2007

(65) Prior Publication Data

US 2008/0037212 A1    Feb. 14, 2008

(30) Foreign Application Priority Data

Aug. 8, 2006    (TW) .............................. 95213942 U (51) Int. Cl.
  G06F 1/16    (2006.01)
  H05K 5/00    (2006.01)
  H05K 7/00    (2006.01)

(52) U.S. Cl. .................... 361/679.35; 361/679.33; 361/679.34

(58) Field of Classification Search ............. 361/685, 361/679.33, 679.34, 679.35, 679.36; 360/97.01, 360/97.02
See application file for complete search history.

(56) References Cited

U.S. PATENT DOCUMENTS

| | | | |
|---|---|---|---|
| 2,747,166 A * | 5/1956 | Hoffarth ................ 439/884 |
| 5,833,480 A * | 11/1998 | Austin ................... 361/816 |
| 6,201,700 B1 * | 3/2001 | Tzinares et al. ............ 361/721 |
| 6,292,455 B1 * | 9/2001 | Saruwatari et al. ......... 720/692 |
| 6,404,646 B1 * | 6/2002 | Tsai et al. ................ 361/758 |
| 6,535,394 B1 * | 3/2003 | Hirzmann ................. 361/803 |
| 6,762,932 B2 * | 7/2004 | Regimbal et al. ....... 361/679.33 |
| 6,781,055 B2 * | 8/2004 | Chen .................... 361/752 |
| 7,028,389 B2 * | 4/2006 | Chang .................. 361/801 |
| 7,227,761 B2 * | 6/2007 | Estes et al. ............. 361/810 |
| 7,369,402 B2 * | 5/2008 | Huang ............... 361/679.33 |
| 7,466,562 B2 * | 12/2008 | Gilliland et al. ........... 361/803 |
| 7,471,509 B1 * | 12/2008 | Oliver ................ 361/679.33 |
| 2003/0174464 A1 * | 9/2003 | Funawatari et al. ......... 361/685 |
| 2005/0024823 A1 * | 2/2005 | Jo ....................... 361/687 |
| 2006/0061954 A1 * | 3/2006 | Lam ..................... 361/685 |

* cited by examiner

Primary Examiner—Jayprakash N Gandhi
Assistant Examiner—Adrian S Wilson
(74) Attorney, Agent, or Firm—Rosenberg, Klein & Lee (57) ABSTRACT

An external box with a shockproofing mechanism is disclosed. The external box accommodates a hard disk that has a plurality of opening holes formed on a bottom side thereof. The external box comprises: a box body, a plurality of positioning posts, a plurality of elastic elements, and a cover body. The box body has a bottom seat. The positioning posts are disposed on the bottoms seat. The elastic elements are disposed around the positioning posts, respectively. The cover body covers the box body. The opening holes correspond to the positioning posts, and the positioning posts are respectively accommodated in the opening holes for contacting the hard disk with the elastic elements to achieve a shockproof effect.

14 Claims, 9 Drawing Sheets

EXTERNAL BOX WITH SHOCKPROOFING MECHANISM

BACKGROUND OF THE INVENTION

1. Field of the Invention

The present invention relates to an external box, and particularly relates to an external box with a shockproofing mechanism.

2. Description of the Related Art

Prior art hard disks are directly installed in an external box and directly contact a protective board of the external box. Hence, any external force pressed on the external box is directly transmitted from the external box to the hard disk. Hence, the hard disk can be damaged.

When the hard disk is lighting damaged by an external force, sore data-storing areas can fail, so that it becomes impossible for the data stored thereon to be read. When the hard disk is seriously damaged by an external force, the hard disk needs to be replaced. Hence, when a person is canning an external box with a hard disk, the person must always take care of it and fears causing damage to the hard disk.

SUMMARY OF THE INVENTION

The first object of the present invention is to provide an external box with a shockproofing mechanism. To manufacture the shockproofing mechanism, a plurality of positioning posts are disposed in the external box, a plurality of elastic elements are respectively disposed around the positioning posts, and a plurality of washers are respectively disposed around the positioning posts. The hard disk has a plurality of opening holes formed on a bottom side thereof. The hard disk is disposed on the positioning posts and contacts the washers in order to shockproof the hard disk.

The second object of the present invention is to provide an external box with a shockproofing mechanism. The box body has a heat-dissipating net structure disposed on a bottom side thereof.

The third object of the present invention is to provide an external box with a shockproofing mechanism. Each washer is C-shaped, or has three contact points formed on an inner circuit thereof for contacting the corresponding positioning post. Each washer is disposed around the corresponding positioning post.

A first aspect of the present invention is an external box with a shockproofing mechanism. The external box is used to accommodate a hard disk that has a plurality of opening holes formed on a bottom side thereof. The external box comprises: a box body, a plurality of positioning posts, a plurality of elastic elements, and a cover body. The box body has a bottom seat. The positioning posts are disposed on the bottom seat. The elastic elements are disposed around the positioning posts, respectively. The cover body covers the box body. The opening holes correspond to the positioning posts, and the positioning posts are respectively accommodated in the opening holes so that the hard disk contacts the elastic elements.

A second aspect of the present invention is a shockproofing mechanism that comprises a plurality of positioning posts and a plurality of elastic elements. The positioning posts are disposed on a bottom seat. The elastic elements are disposed around the positioning posts, respectively. A hard disk has a plurality of opening holes that correspond to the positioning posts, and the positioning posts are respectively accommodated in the opening holes so that the hard disk contacts the elastic elements.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED BEST MOLDS

Figure 1:
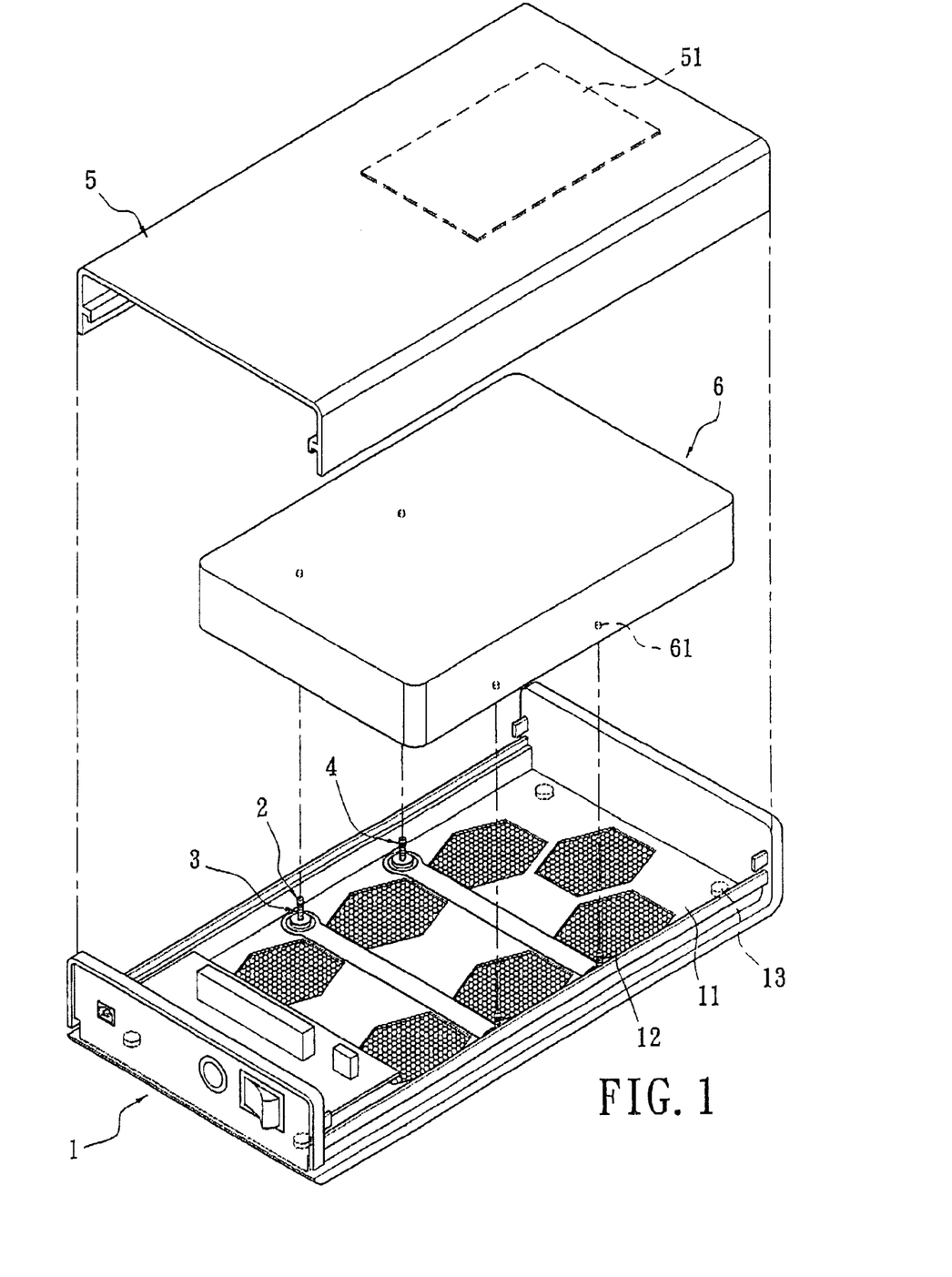
FIG. 1 is a perspective, exploded view of an external box with a shockproofing mechanism according to the present invention.
Figure 2:
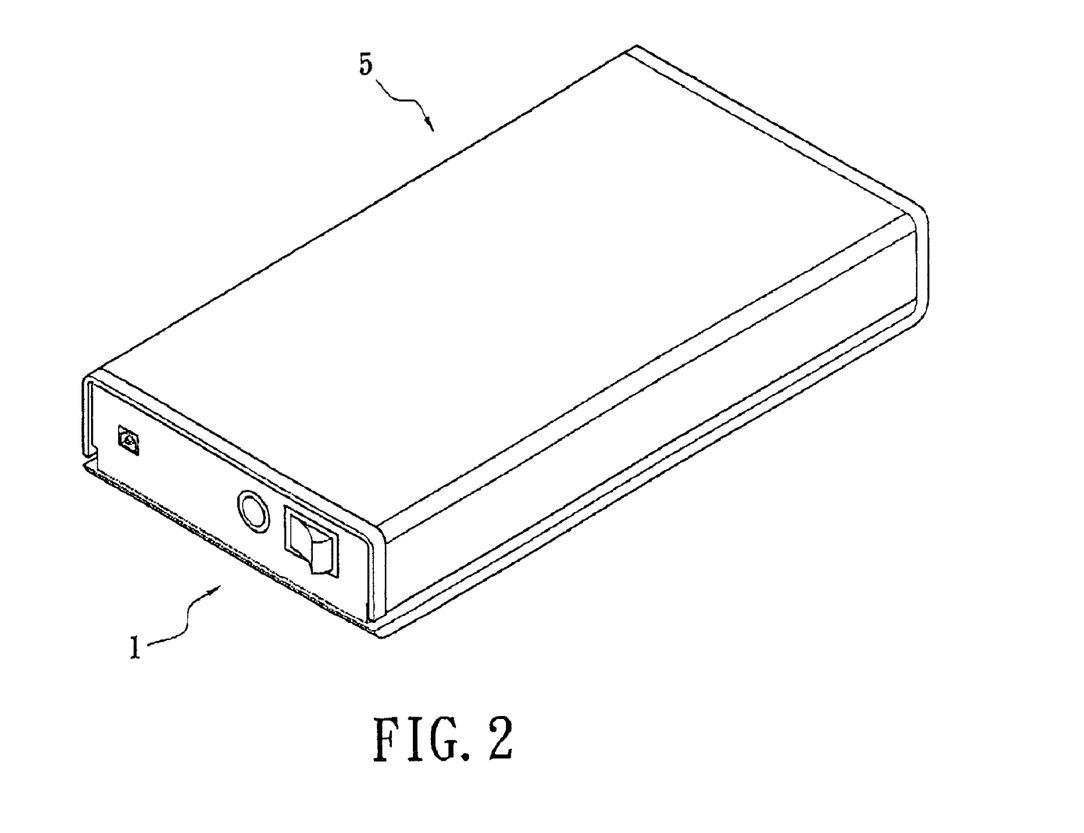
FIG. 2 is a perspective, assembled view of ala external box smith a shockproofing mechanism according to the present invention.

Referring to FIGS. 1 and 2, the present invention provides an external box with a shockproofing mechanism. The external box accommodates a hard disk 6 that has a plurality of opening holes 61 formed on a bottom side thereof. The external box comprises a box body 1, a plurality of positioning posts 2, a plurality of elastic elements 3, a plurality of washers 4, and a cover body 5. Moreover, the box body 1 has a bottom seat 11. The box body 1 can be a metal box body or made of the other materials. The box body 1 has a heat-dissipating net structure 12 disposed on a bottom side thereof for dissipating heat from the bard disk 6. In addition, the box body 1 has a plurality of fixed portions 13 disposed on the bottom side thereof for preventing the box body 1 from sliding. Hence, the box body 1 can be placed stably in a proper place due to the fixed portions 13.

Furthermore, the positioning posts 2 are disposed on the bottom seat 11. The positioning posts 2 can be made of metal material or plastic material. The number of the positioning posts 2 can be two, three, or four. Each positioning post 2 has a protrusion portion 21 formed on a top side thereof. The opening holes 61 correspond to the positioning posts 2. The elastic elements 3 are respectively disposed around the positioning posts 2 and under the protrusion portions 21. The elastic elements 3 can be springs.

Moreover, the cover body 5 covers the box body 1. The cover body 5 has at least one heat-dissipating pad 51 disposed on an inner portion thereof as shown in FIG. 1.

Figure 3:
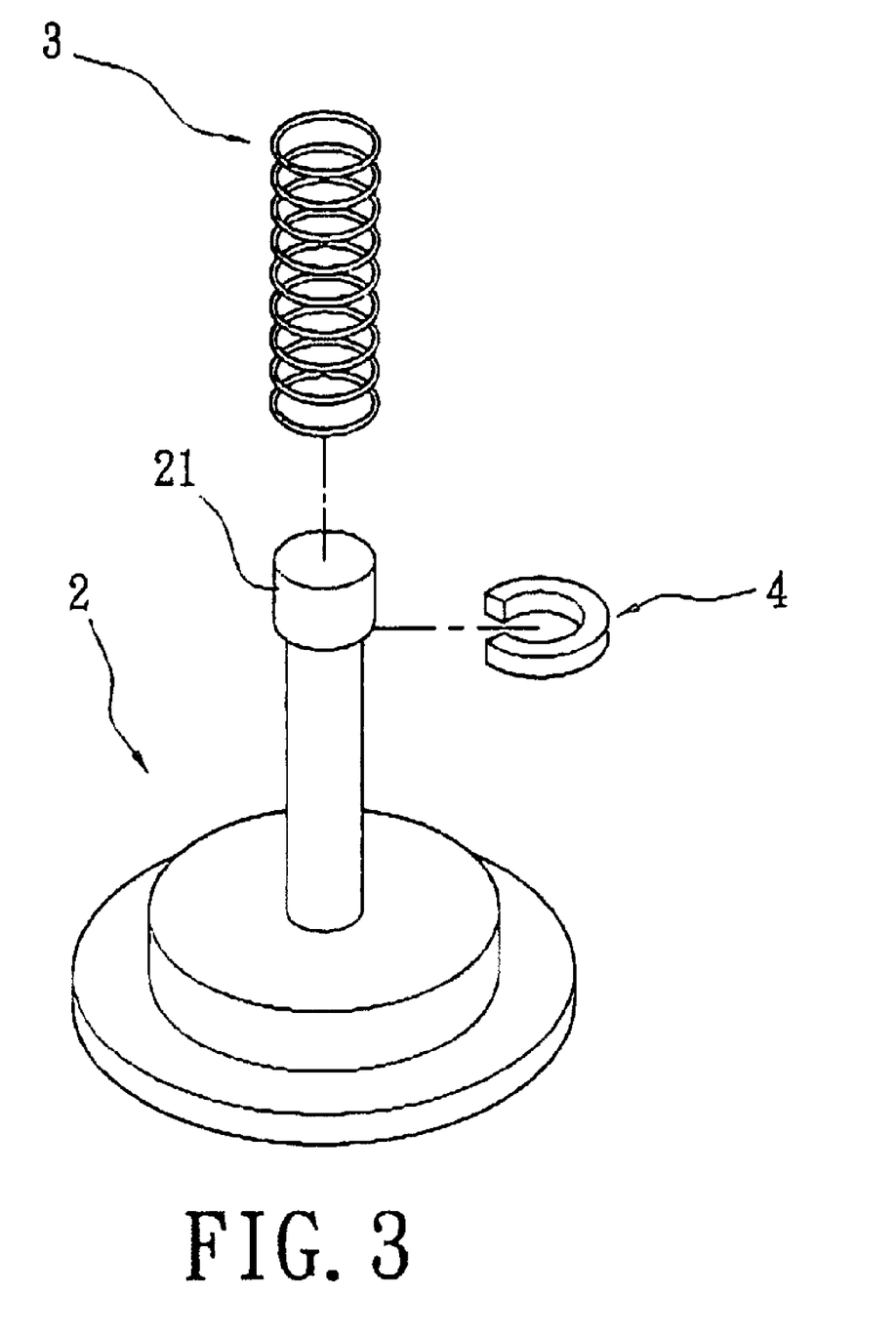
FIG. 3 is a perspective, exploded view of a first type of a shockproofing mechanism according to the present invention.
Figure 4:
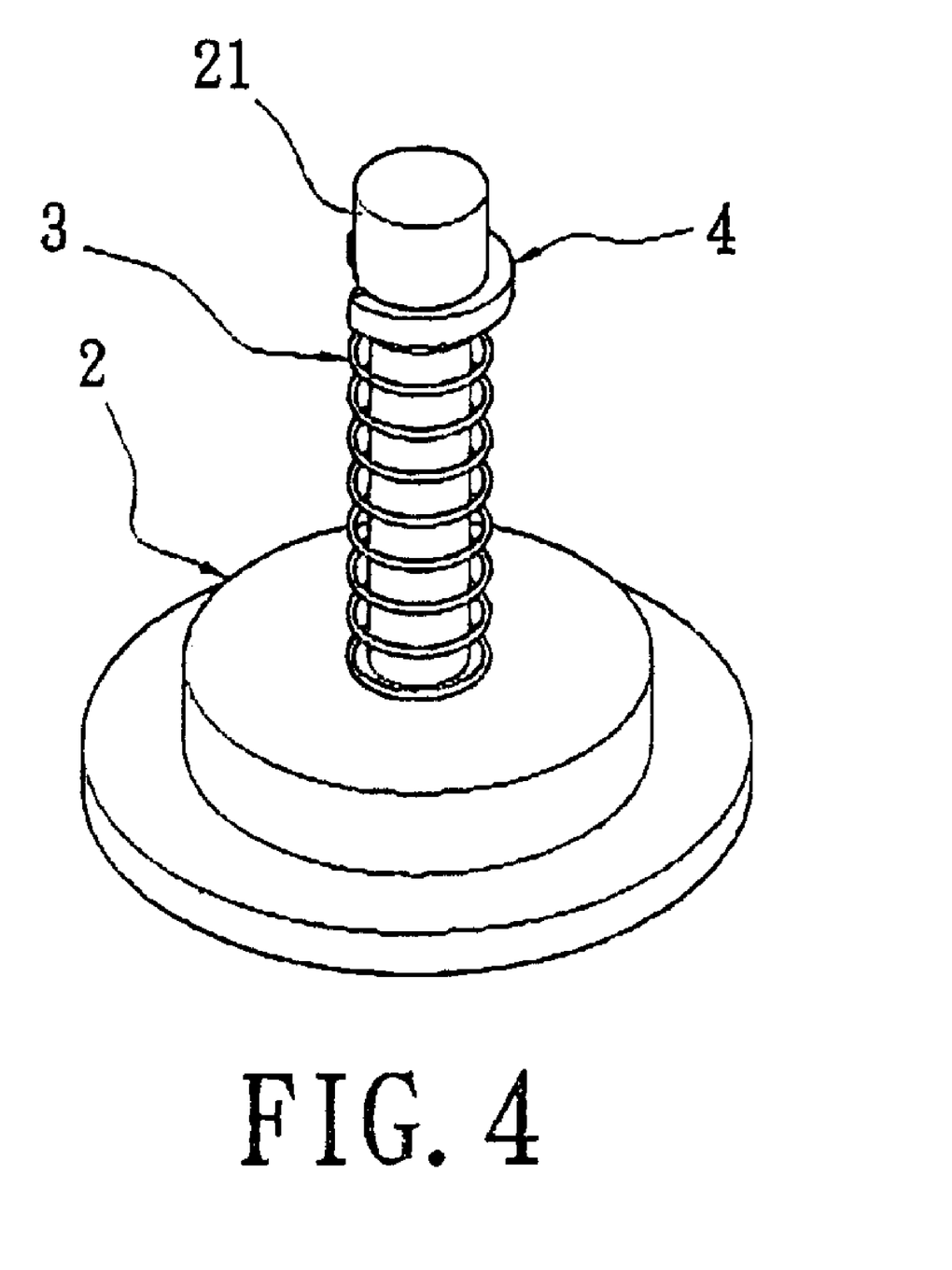
FIG. 4 is a perspective, assembled view of a first type of a shockproofing mechanism according to the present invention.

Referring to FIGS. 3 and 4, each washer 4 is C-shaped and is disposed around the corresponding positioning post 2. Each washer 4 is disposed between the corresponding protrusion portion 21 and the corresponding elastic element 3.

Figure 5:
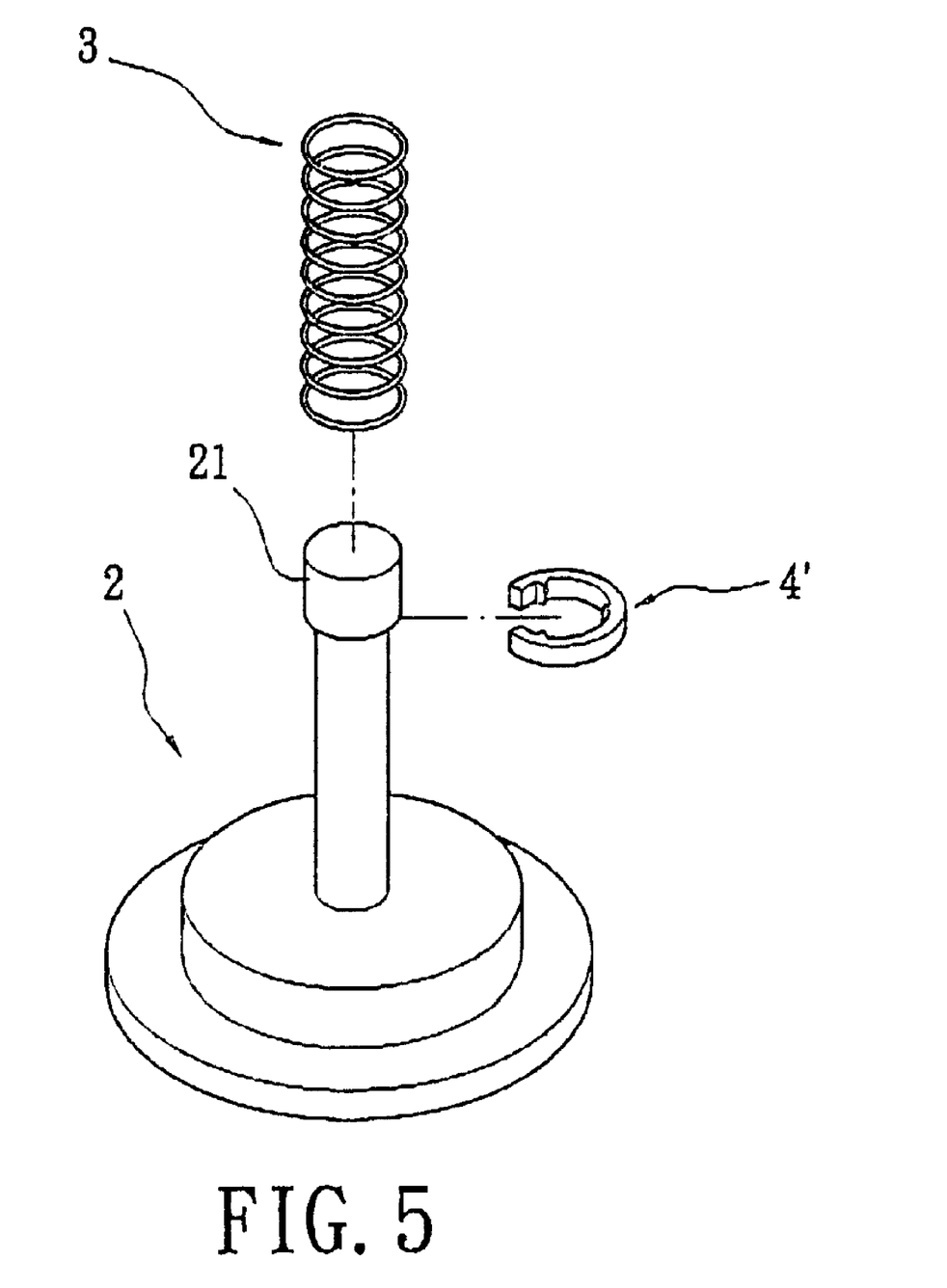
FIG. 5 is a perspective, exploded view of a second type of a shockproofing mechanism according to the present invention.
Figure 6:
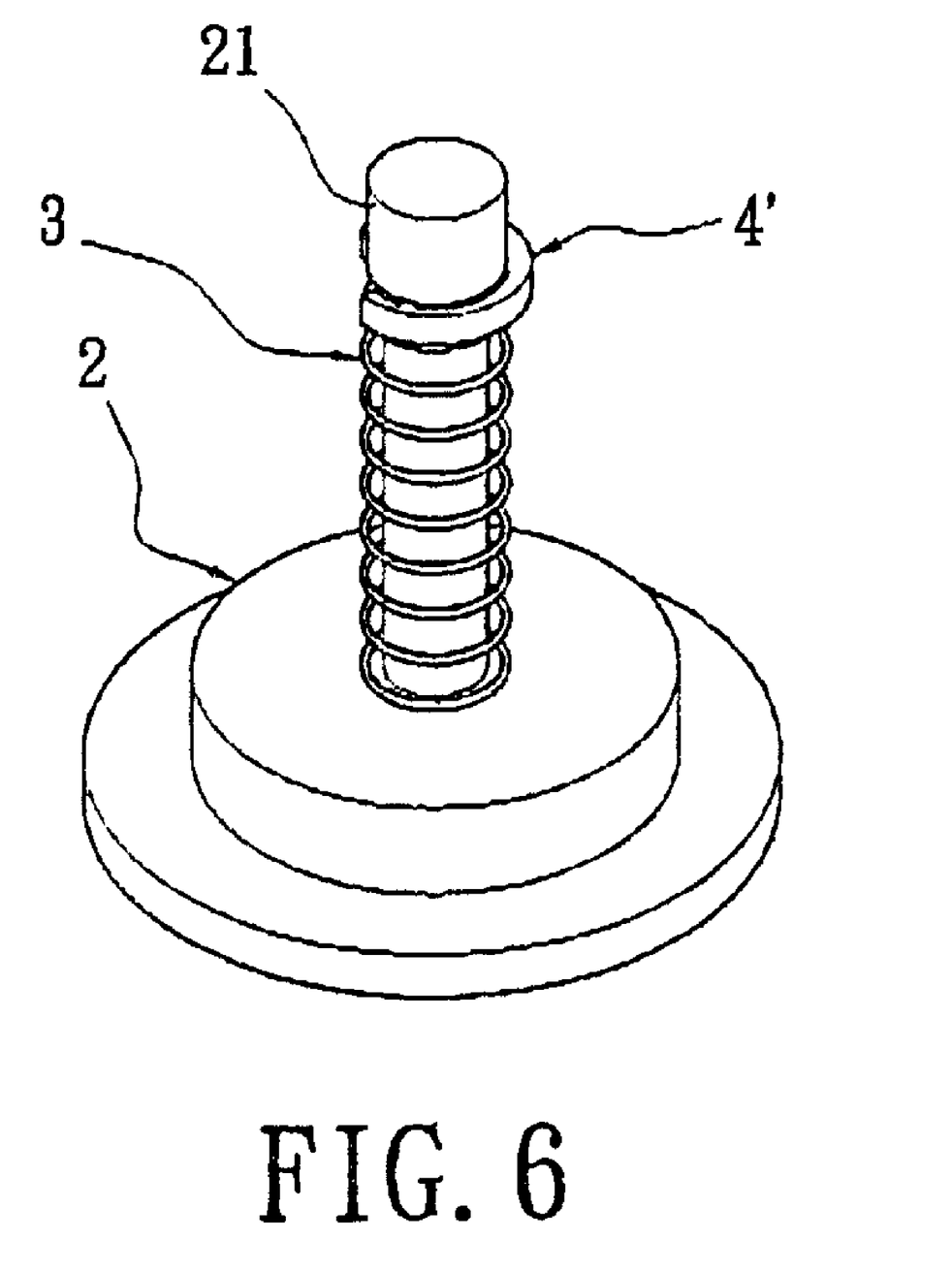
FIG. 6 is a perspective, assembled view of a second taupe of a shockproofing mechanism according to the present invention.
Figure 7:
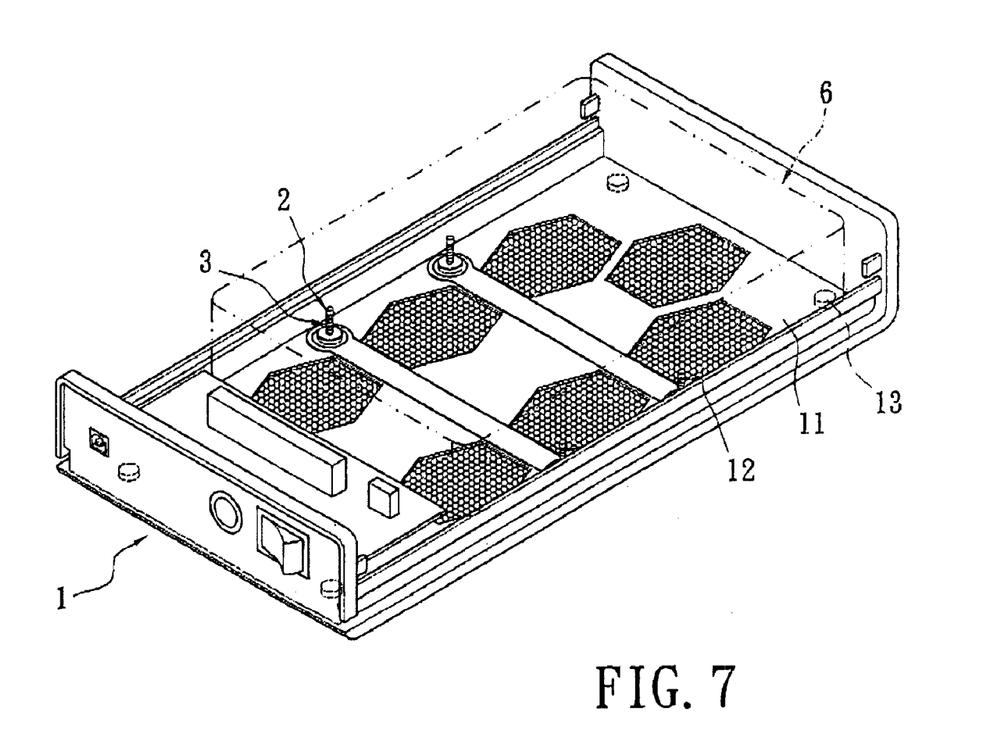
FIG. 7 is a perspective, schematic diagram before a hard disk presses against the washers and the elastic elements according to the present invention.
Figure 8:
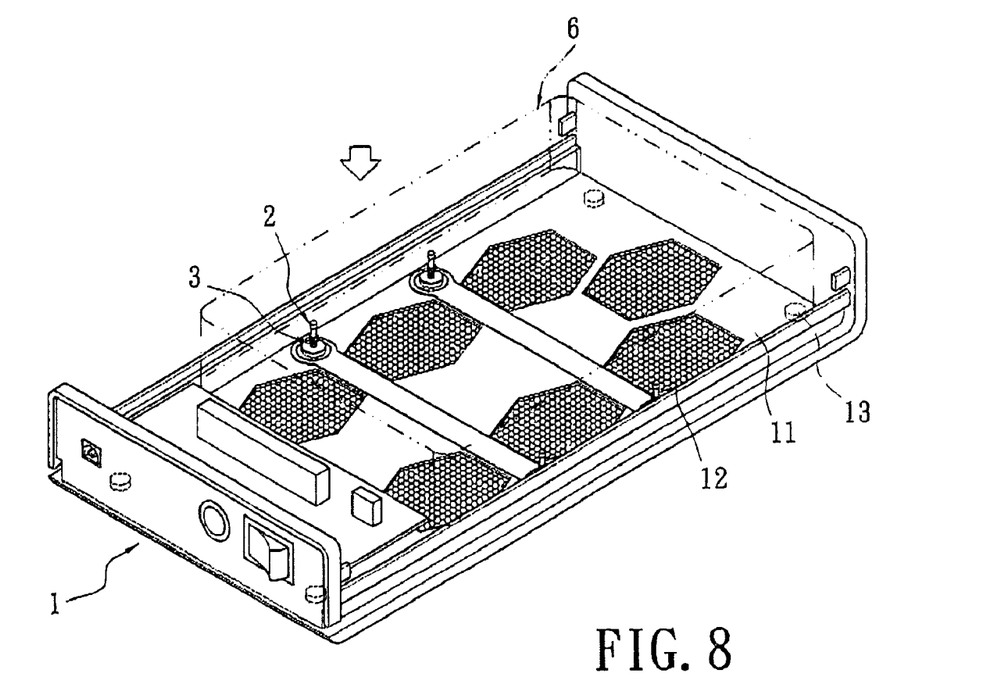
FIG. 8 is a perspective, schematic diagram after a hard disk presses against the washers and the elastic elements according to the present invention.
Figure 9:
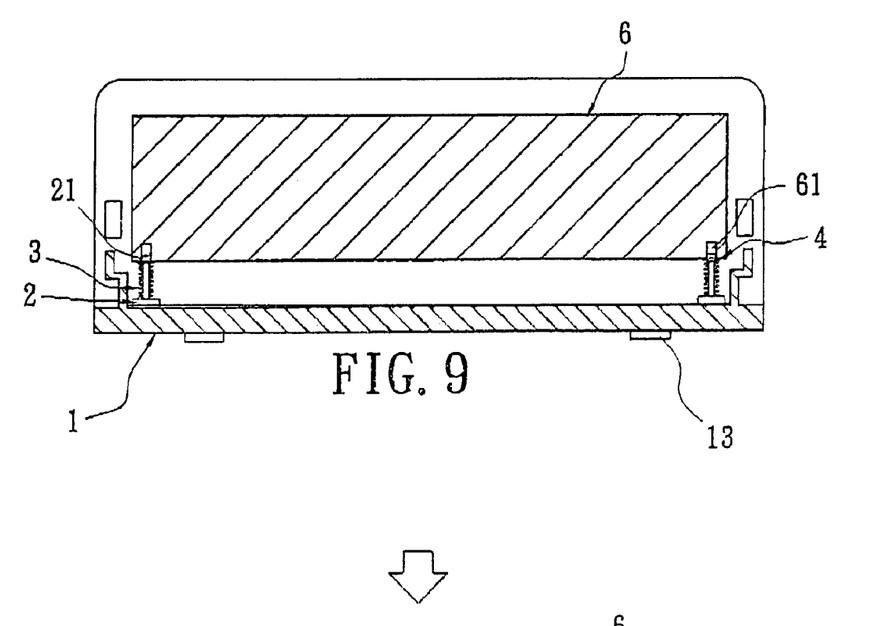
FIG. 9 is a cross-sectional diagram before a hard disk presses against the washers and the elastic elements according to the present invention.
Figure 10:
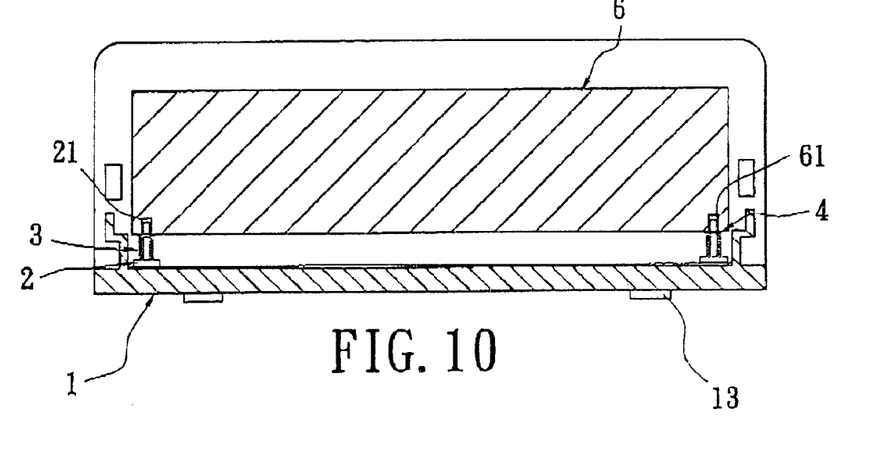
FIG. 10 is a cross-sectional diagram after a hard disk presses against the washers and the elastic elements according to the present invention.

Please refer to FIGS. 5 and 6. Each washer 4' has three contact points formed on an inner circuit thereof for contacting the corresponding positioning post 2. Each washer 4' is disposed around the corresponding positioning post 2. Each washer 4' is disposed between the corresponding protrusion portion 21 and the corresponding elastic element 3.

Referring to FIGS. 1 and 2 again, the positioning posts 2 are respectively accommodated in the opening holes 61 so that the hard disk 6 contacts the washers 4 or 4'.

Please refer to FIGS. 7 to 10. The hard disk 6 is disposed on the positioning posts 2 and contacts the washers 4. When a force presses against the hard disk 6, a shockproof effect acts on the hard disk 6 due to the contraction of the elastic elements 3.

In conclusion, the external box with the shockproofing mechanism has the following advantages, as are described below:

1. The heat-dissipating net structure 12 is disposed on the bottom side of the box body 1 for dissipating heat from the hard disk 6.

2. The fixed portions 13 are disposed on the bottom side of the box body 1 to prevent the box body 1 from sliding. Hence, the box body 1 can be placed stably in a proper place due to the fixed portions 13.

3. Each washer 4 or 4' is C-shaped, or has three contact points formed on an inner circuit thereof for contacting the corresponding positioning post 2. Each washer 4 or 4' is disposed around the corresponding positioning post 2. Hence, the hard disk 6 is protected due to the contraction of the elastic elements 3.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications axe intended to be embraced within the scope of the invention as defined in the appended claims.

What is claimed is:

1. An external box with a shockproofing mechanism, the external box for accommodating a hard disk that has a plurality of opening holes formed on a bottom side thereof; the external box comprising:
 a box body having a bottom seat;
 a plurality of positioning posts disposed on the bottom seat;
 a plurality of washers disposed on said positioning posts for slideable movement along said positioning posts;
 a plurality of substantially cylindrically shaped elastic elements disposed on the positioning posts between said plurality of washers and said bottom seat of said box body respectively; and
 a cover body covered on the box body;
 wherein the opening holes correspond to the positioning posts, and the positioning posts are respectively accommodated in the opening holes for contacting the hard disk with the elastic elements.

2. The external box as claimed in claim 1 wherein the box body is a metal box body.

3. The external box as claimed in claim 1, wherein the box body has a heat-dissipating net structure disposed on a bottom side thereof.

4. The external box as claimed in claim 1, wherein the box body has a plurality of fixed portions disposed on a bottom side thereof for preventing the box body from sliding.

5. The external box as claimed in claim 1, wherein the positioning posts are made of metal material.

6. The external box as claimed in claim 1, wherein the positioning posts are made of plastic material.

7. The external box as claimed in claim 1, wherein the number of the positioning posts is two.

8. The external box as claimed in claim 1, wherein the number of the positioning posts is three.

9. The external box as claimed in claim 1, wherein the number of the positioning posts is four.

10. The external box as claimed in claim 1, wherein the elastic elements are springs.

11. The external box as claimed in claim 1, wherein each washer is C-shaped.

12. The external box as claimed in claim 1, wherein each washer has three contact points formed on an inner circuit thereof for contacting with the corresponding positioning post.

13. The external box as claimed in claim 1, wherein each positioning post has a protrusion portion formed on a top side thereof, and each washer is disposed between the corresponding protrusion portion and the corresponding elastic element.

14. The external box as claimed in claim 1, wherein the cover body has at least one heat-dissipating pad disposed on an inner portion thereof.

* * * * *